No. 12,104. REISSUED APR. 7, 1903.

E. G. ACHESON.

ELECTRIC FURNACE.

APPLICATION FILED FEB. 11, 1903.

2 SHEETS—SHEET 1.

WITNESSES

Warren W. Swartz

H. M. Loomis

INVENTOR

Edward G. Acheson by Bakewell & Byrnes his Attorneys

No. 12,104. REISSUED APR. 7, 1903.

E. G. ACHESON.

ELECTRIC FURNACE.

APPLICATION FILED FEB. 11, 1903.

2 SHEETS—SHEET 2.

WITNESSES

Warren W. Swartz

A. M. Corwin

INVENTOR

Edward G. Acheson by Bakewell & Byrnes his Attorneys

UNITED STATES PATENT OFFICE.

EDWARD GOODRICH ACHESON, OF NIAGARA FALLS, NEW YORK.

ELECTRIC FURNACE.

SPECIFICATION forming part of Reissued Letters Patent No. 12,104, dated April 7, 1903.

Original No. 718,892, dated January 20, 1903. Application for reissue filed February 11, 1903. Serial No. 142,964.

*To all whom it may concern:*

Be it known that I, EDWARD GOODRICH ACHESON, of Niagara Falls, in the county of Niagara and State of New York, have invented a new and useful Improvement in Electric Furnaces, of which the following is a full, clear, and exact description, reference being had to the accompanying drawings, forming part of this specification, in which—

Figure 1:
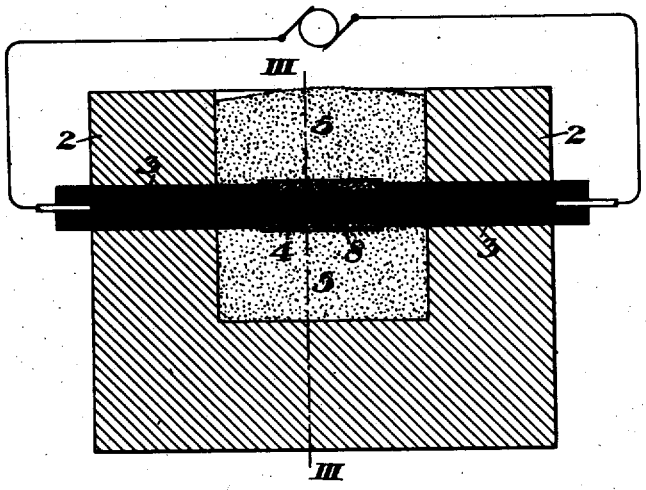
Figure 3:
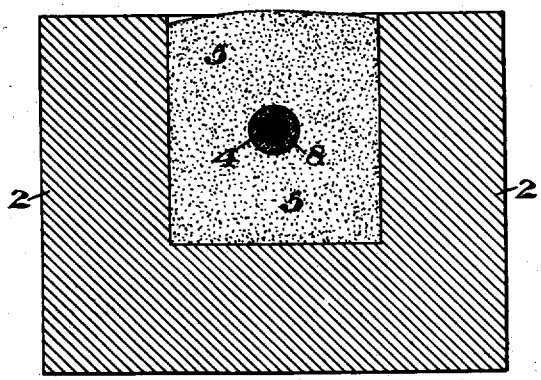
Figure 2:
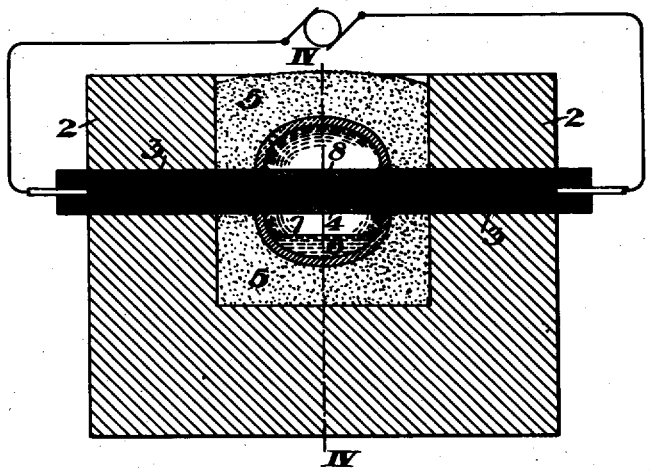
Figure 4:
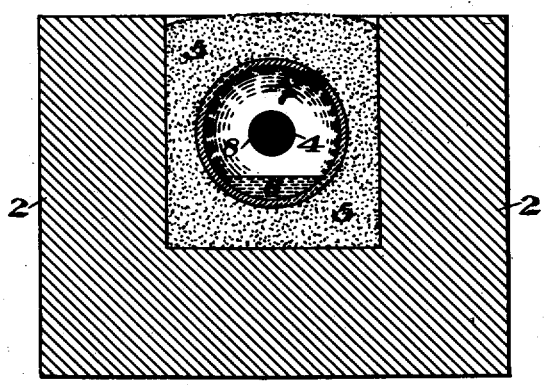

Figure 1 shows in vertical longitudinal section an electric furnace constructed in accordance with my invention. Fig. 2 is a similar view showing the furnace at the end of the operation. Fig. 3 is a vertical cross-section on the line III III of Fig. 1. Fig. 4 is a vertical cross-section on the line IV IV of Fig. 2.

My invention relates to an electric furnace so constructed that the materials to be treated therein may be subjected to heat without any disturbing chemical influence being exerted upon them by the conductor through which the current passes and in which the heat is generated. Such conductors are usually made of carbon, and the affinity of carbon for other elements has hitherto served to prevent the use of electric furnaces for the performance of any of the reactions for which it otherwise would be well adapted.

In constructing my furnace I take a conductor, preferably of carbon, and place between it and the material to be treated a protecting layer or sheath composed of a refractory carbid, which is preferably preformed and placed around the conductor, or it may be created in the furnace at the outset of the process, and having thus protected the conductor from contact with the material to be treated I raise the conductor to a high temperature by the passage of an electric current and heat the material to be treated by conduction or radiation therefrom. The material to be treated may consist of a mixture of metallic oxid or compound with a reducing agent, preferably carbon, and being shielded from the core is not affected thereby to any injurious extent, or the furnace may be used simply for melting materials, such as silica or other compounds or metals. The material to be heated is necessarily different in ingredients or proportions from the protecting layer of carbid, as will be more fully set forth.

Referring now to the drawings, I will describe my furnace in its best form prepared for use in the reduction of silicon from silica.

In the drawings, Fig. 1, 2 represents the walls of an electric furnace.

3 3 are the terminals of the dynamo-circuit.

4 is the carbon conductor or core which connects the terminals and is or may be constituted of granular coke, though rods or plates of carbon may be employed.

5 is the body of charge mixture which surrounds the conductor and is composed of the oxid to be reduced mixed with powdered carbon in chemical proportion suitable for reduction.

Between the body of material to be heated and the conductor 4 is a shield or layer 8, composed either of preformed refractory carbid or of the materials which when combined will form a carbid. Thus the shield may consist of crushed crystals of carbid of silicon or carbid of boron placed around the conductor, or it may consist of sand or boracic acid and carbon mixed together in proper proportion to form carbid of silicon or carbid of boron, or these oxids and carbon in less proportion may be placed in intimate contact with the core and converted into carbid during the first stages of the process by combining with a portion of the carbon of the core. When current is passed through this conductor, its first effect is to heat the shield 8, and if it consists of the preformed carbid to cause it to adhere into a dense mass, or if it is composed of materials adapted to combine as a carbid the heat will cause such combination to take place, and in either case the conductor will be protected from contact with the charge by the intervening layer or shield, the heat which is generated in the conductor being transmitted through such shield to the charge mixture. When the charge mixture consists of silica and carbon, they will react and will liberate metallic silicon, which will collect in a molten mass 6, Fig. 2, at the bottom of the cavity 7, which the reduction creates, and the carbid shield 8 will be rendered sufficiently strong and dense to uphold the conductor, even if the latter is made of granular carbon.

The electric current which I employ may be alternating or direct and of a current density of, say, thirty amperes or more per square inch of cross-section of core when the core is granular and of greater current density when the core is made of rods or plates. Care should be taken not to use a current density great enough to generate such a high degree of heat as to decompose the carbid shield.

During the process the charge mixture is protected from the core, which is thereby prevented from interfering with the reactions which are desired.

The preferable form of my furnace is that in which the conductor is shielded by a layer of preformed carbid, because such layer is caused by the heat to cohere in a dense mass of good heat conductivity, through which the heat is readily transmitted and which thoroughly protects the conductor from the charge. I therefore intend to make specific claim thereto. It will be understood, however, that within the scope of my invention, as broadly claimed, the furnace may be modified in construction (a tube of carbid which has already been formed and filled with carbon may be used in building the furnace) and that it is not necessary that the carbid layer or shield should completely surround the conductor, it being necessary only that it should be so arranged as to protect the conductor from contact with the charge.

The incandescent furnace is in many respects the most efficient, easily-handled, and all-around useful design for electric heating; but it has heretofore been seriously limited by the reactions that take place between the conducting-core and the materials being operated upon. Efforts have been made to overcome this difficulty by interposing protecting-coatings, and for this purpose clay, corundum, and other highly-refractory materials have been used and found more or less efficient where the temperatures were not sufficient to cause the melting of the material of which they were formed, or, as sometimes occurs, their reduction where they are in contact with the carbon conducting-core. Another difficulty that inventors have sought to overcome is the tendency of the current to leave the properly-prepared conducting-core and pass through the materials being operated upon, where they form more or less of a conducting mass. To correct this difficulty, various materials have been suggested, such as clay, oxids, and in some instances finely-powdered carbon or charcoal, on account of their relatively high resistance quality, as is suggested by Elihu Thomson in his Patent No. 513,602. All of these attempts have been more or less successful, but have not met the conditions as met by my discovery that carbid of silicon might be used for the double purpose of preventing chemical reaction between the carbon core and the charge of the furnace and also largely assist in insulating the surrounding charge in order that the current might be more thoroughly confined to the prepared conducting-core. Carbid of silicon is stable at the highest temperatures ordinarily desired for metallurgical operations, and the silicon being already thoroughly satisfied no reaction occurs between it and the conducting-core. I have also discovered that it is inert at high temperatures while in contact with many materials it is desired to reduce, melt, or smelt in the electric furnace.

I claim—

1. An electric furnace having a carbon electrical conductor with a protecting layer of refractory carbid and having electrical connections at the ends of the conductor; substantially as described.

2. An electric furnace having an electrical conductor, and a protecting layer of preformed refractory carbid in contact therewith, said conductor having electrical connections at its ends; substantially as described.

3. An electric furnace having an electrical conductor and a protecting layer of refractory carbid, said carbid layer being placed around the conductor and surrounded by a space for the reception of material to be treated and the conductor having electrical connections at its ends; substantially as described.

In testimony whereof I have hereunto set my hand.

EDWARD GOODRICH ACHESON.

Witnesses:
M. E. JAMES,
FRANK N. COE.